United States Patent
Wasalwar et al.

(10) Patent No.: US 10,123,373 B1
(45) Date of Patent: Nov. 6, 2018

(54) TRANSFER OF WCD SERVICE-CONTEXT INFORMATION THROUGH THE WCD TO FACILITATE TRANSITION OF THE WCD TO A NEW SERVING BASE STATION

(71) Applicant: Sprint Spectrum L.P., Overland Park, KS (US)

(72) Inventors: Ravindra Wasalwar, Herndon, VA (US); Hetal Mistry, Ashburn, VA (US); Ankitkumar Patel, Ashburn, VA (US); Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/649,307

(22) Filed: Jul. 13, 2017

(51) Int. Cl.
*H04W 76/19* (2018.01)
*H04W 36/36* (2009.01)
*H04W 76/18* (2018.01)
*H04W 76/27* (2018.01)
*H04W 92/20* (2009.01)
*H04W 88/08* (2009.01)

(52) U.S. Cl.
CPC .......... *H04W 76/18* (2018.02); *H04W 76/19* (2018.02); *H04W 76/27* (2018.02); *H04W 88/08* (2013.01); *H04W 92/20* (2013.01)

(58) Field of Classification Search
CPC ..... H04W 36/08; H04W 36/18; H04W 36/36; H04W 76/18; H04W 76/19
USPC ......................................................... 455/437
See application file for complete search history.

(56) References Cited

U.S. PATENT DOCUMENTS

| 7,542,449 B2 * | 6/2009 | Kim .................. | H04W 36/0055 370/310 |
| 9,210,621 B1 | 12/2015 | Bertz et al. | |
| 9,344,938 B1 | 5/2016 | Singh et al. | |
| 2007/0115883 A1 * | 5/2007 | Narayanan ........ | H04W 36/0011 370/331 |
| 2010/0240374 A1 * | 9/2010 | Lindoff ................. | H04W 76/19 455/437 |

* cited by examiner

*Primary Examiner* — Christopher M Brandt

(57) ABSTRACT

When a first base station is serving a wireless client device (WCD), the first base station provides the WCD with a copy of the WCD context information that the first base station maintains for serving the WCD. When the WCD then experiences a radio-link failure and connects with the second base station, the WCD will forward the provided WCD context information to the second base station, for use by the second base station as a basis to serve the WCD. This process of transferring the context information through the WCD from the old base station to the new base station could help to avoid the need for the second base station to engage in direct context-transfer signaling with the first base station, which could be especially useful in a scenario where the base stations are unable to engage in that direct transfer.

20 Claims, 4 Drawing Sheets

TRANSFER OF WCD SERVICE-CONTEXT INFORMATION THROUGH THE WCD TO FACILITATE TRANSITION OF THE WCD TO A NEW SERVING BASE STATION

BACKGROUND

A typical wireless communication network includes a number of base stations each radiating to provide coverage in which to serve wireless client devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a network may operate in accordance with a particular air interface protocol, examples of which include, without limitation, Long Term Evolution (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), IEEE 802.11 (WIFI), BLUETOOTH, and others.

While a WCD is served by a base station in this arrangement, the base station will typically maintain WCD context information to facilitate serving the WCD. This context information could include information related to the WCD's existing connections with the base station and the network, such as radio-link security key information to facilitate secure air interface communication between the WCD and the base station, and bearer information to facilitate management of WCD air interface communications and routing of WCD communications within the network. Further, the context information could include information about the WCD, such as capabilities data and service profile data, which could impact how the base station serves the WCD. Other examples are possible as well.

OVERVIEW

When a WCD is so served by a base station and the WCD loses radio-link connectivity, the WCD could respond by searching for other coverage and, upon finding other coverage, could connect with the base station that provides the other coverage. When this happens, the new base station and old base station could engage in signaling with each other to transfer the WCD context information to the new serving base station, so that the new base station can serve readily the WCD. Provided with the WCD context information, for instance, the new base station may be able to readily engage in secure air interface communication with the WCD, switch any bearer connections for the WCD to be via the new base station, and otherwise manage service of the WCD.

Although this transfer of WCD context information from the old base station to the new base station might work well in many cases, there could be situations where the transfer process would not work. By way of example, if the old and new base stations are made by different vendors or are otherwise configured differently than each other, they might use different signaling protocols for the transfer process, so they may be unable to engage in understandable signaling with each other to conduct the transfer. For instance, the two base stations may use differently named or differently coded context-transfer messages than each other, so the old base station may not understand a context-information request from the new base station, or the new base station may not understand a context-information response from the old base station. This could happen even if the context information itself is set forth in a standard format.

Disclosed herein is a method and system that could help to avoid this problem. In accordance with the disclosure, when the old base station is serving the WCD, the old base station will provide the WCD with a copy of the WCD context information that the old base station maintains for serving the WCD. When the WCD then experiences a radio-link failure and connects with the new base station, the WCD will forward the provided WCD context information to the new base station, for use by the new base station as a basis to serve the WCD. This process of transferring the context information through the WCD from the old base station to the new base station could help to avoid the need for the new base station to engage in direct context-transfer signaling with the old base station.

Accordingly, in one respect, disclosed is a method operable in a wireless communication system in which a first base station serves a WCD and maintains service-context information to facilitate serving the WCD, the service-context information including, for instance, WCD bearer connection information. This method is operable by the WCD and provides a way to transfer the service-context information from the first base station to a second base station so as to facilitate transition of the WCD from being served by the first base station to being served by the second base station.

In accordance with the method, while the WCD is being served by the first base station, the WCD receives from the first base station the service-context information and stores the received service-context information. Further, when the WCD is thereafter transitioning to being served by the second base station as a result of a radio-link failure between the WCD and the first base station, the WCD retrieves the stored service-context information and transmits to the second base station the retrieved service-context information for use by the second base station to facilitate serving the WCD.

In another respect, disclosed is a method to facilitate transition of a WCD from being served by a first base station to being served by a second base station in a situation where, while the WCD is being served by the first base station, the first base station maintains service-context information for the WCD, the service-context information including at least bearer-connection information and radio-link security information. In accordance with the method, while the first base station is serving the WCD, the first base station transmits to the WCD the service-context information for storage by the WCD. And thereafter the second base station receives a transmission of the service-context information from the WCD, for use by the second base station to facilitate serving the WCD.

Still further, in yet another respect, disclosed is a WCD configured to transfer service-context information from a first base station to a second base station so as to facilitate transition of the WCD from being served by the first base station to being served by the second base station. In practice, while the first base station serves the WCD, the first base station maintains the service-context information for the WCD, the service-context information including at least bearer-connection information and radio-link security information.

In accordance with the disclosure, the WCD includes a wireless communication interface, including a radio and antenna structure, configured to engage in air interface communication with the first and second base stations. Further, the WCD includes a processing unit, non-transitory data storage, and program instructions stored in the non-transitory data storage and executable by the processing unit to cause the WCD to carry out various operations to facilitate the service-context information transfer. In particular, the operations include (a) while the WCD is being served by the first base station, receiving via the wireless communication interface from the first base station the service-context information and storing the received service-context information in the non-transitory data storage, and (b) when the WCD is thereafter transitioning to be served by the second base station as a result of a radio-link failure between the WCD and the first base station, retrieving the stored service-context information and transmitting via the wireless communication interface to the second base station the retrieved service-context information, for by the second base station to facilitate serving the WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
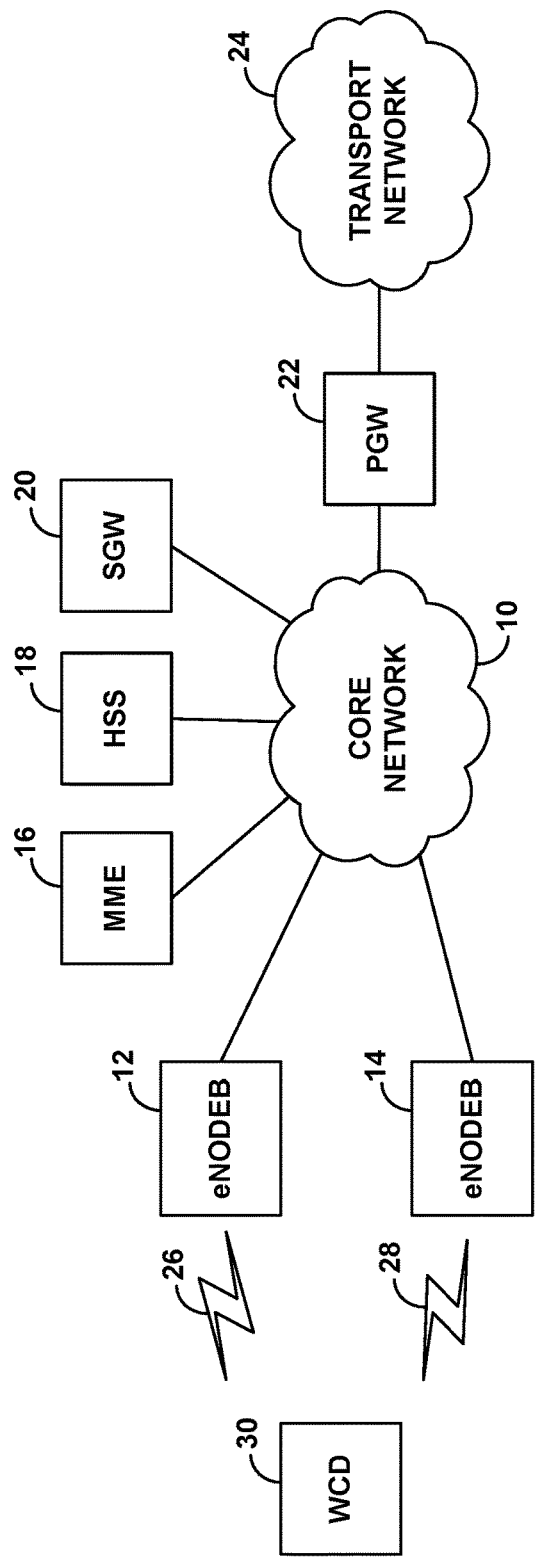
FIG. 1 is a simplified block diagram of an example network arrangement in which aspects of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve WCDs with wireless packet data communication service, including possibly voice-over-packet service, but may also provide other functions. The LTE network may be implemented by a wireless service provider. As shown, the LTE network includes a core network 10 (or "evolved packet core" (EPC)) could be a packet-switched network, compliant with the industry standard system architecture evolution (SAE) for the LTE protocol, and thus the entities shown on the core network could each have an IP address and be configured to communicate with each other over packet-based tunnels or other communication interfaces.

Shown sitting on the core network 10 are, by way of example, two LTE base stations 12, 14, referred to as evolved-Node-B's (eNodeBs), as well as a mobility management entity (MME) 16, a home subscriber server (HSS) 18, a serving gateway (SGW) 20, and a packet data network (PDN) gateway (PGW) 22, with the PGW then providing connectivity with a packet-switched transport network 24 such as the Internet. With this arrangement, each eNodeB could have communication interfaces with the MME 16 and the SGW 20 and could be configured to communicate with the MME and the SGW over those interfaces, and the SGW could have communication interfaces with the PGW and could be configured to communicate with the PGW over those interfaces. Further, the eNodeBs could have a communication interface (e.g., X2 interface) with each other and could be configured to communicate with each other over that interface.

Each of the eNodeBs 12, 14 is configured to provide a respective coverage area 26, 28, such as a respective cell or sector, in which the eNodeB can serve WCDs such as those noted above. As such, each eNodeB could take various forms. For instance, an eNodeB could be a macro eNodeB of the type typically including a tower-mounted antenna structure and providing a broad of coverage. Or an eNodeB could be a small-cell eNodeB or the like (e.g., a femtocell, relay, etc.) of the type typically having a smaller form factor and providing a narrower range of coverage.

Under LTE, each eNodeB coverage area has a physical cell identifier (PCI) that distinguishes it from adjacent coverage areas. Further, each coverage area defines an air interface on a carrier, which could be frequency division duplex (FDD), in which separate ranges of frequency are provided for downlink and uplink communication, or time division duplex (TDD), in which a single range of frequency is multiplexed over time between downlink and uplink communication. Such a carrier would have a frequency bandwidth (e.g., 1.4 MHz, 3 MHz, 5 MHz, 10 MHz, 15 MHz, or 20 MHz, among other possibilities). In addition, the air interface is divided over time into a continuum of 10-millisecond frames each divided into ten 1-millisecond subframes. And in each subframe, the air interface is divided over time into fourteen symbol time segments of 66.7 microseconds, and the carrier bandwidth is divided into 15 kHz subcarriers, thus defining in each subframe an array of resource elements that can be modulated to carry control signaling and bearer data.

In accordance with LTE, certain of these resource elements are then reserved to define channels for carrying particular signaling and bearer communications.

For instance, on the downlink, resource elements in the first one, two, or three symbol time segments per subframe are generally reserved to define a control region for carrying control signaling from the eNodeB to WCDs, and remaining resource elements are generally reserved to define a shared channel region in which the eNodeB can schedule data communications to particular WCDs. Further, certain resource per frame are reserved to define synchronization channels that carry signaling to enable time synchronization and that indicate a physical cell identifier (PCI) of the coverage area. And certain resource elements per subframe are reserved to carry a reference signal that WCDs can measure to evaluate coverage strength.

Likewise, on the uplink, certain resource elements per subframe (namely, those at the low end and high end of the carrier bandwidth) are generally reserved to define a control region for carrying control signaling from WCDs to the eNodeB, and remaining resource elements are generally reserved to define a shared channel in which the eNodeB can schedule data communications from particular WCDs. Further, certain resource elements per subframe are reserved for other purposes, such as to define a random access channel for carrying access signaling from WCDs, and to define uplink reference signals for carrying WCD reference signals that the eNodeB could measure to help establish timing of WCD communications.

When a representative WCD 30 first powers on or enters into coverage of the network, the WCD could search for the strongest coverage it can find and could then engage in a signaling process to connect with the eNodeB providing that coverage and to attach with the network.

For instance, the WCD could transmit a random access request to the eNodeB, and the eNodeB could respond by allocating uplink shared-channel resources for use by the WCD to send a connection request. The WCD could then transmit to the eNodeB on the allocated resources a Radio Resource Configuration (RRC) connection request, providing the eNodeB with an identifier of the WCD (e.g., an International Mobile Subscriber Identifier (IMSI)). And the eNodeB could respond to the WCD with an RRC connection setup message providing the WCD with a cell radio network temporary identifier (C-RNTI) useable to identify the WCD in subsequent air interface communications between the WCD and the eNodeB. Further, the eNodeB could establish in data storage a context record for the WCD, indicating in the context record the WCD's C-RNTI and other information associated with the WCD's established RRC connection.

Once the WCD has an established RRC connection with the eNodeB, the WCD could then transmit an attach request to the eNodeB, which the eNodeB could forward to the MME for processing. And upon receipt of the attach request, the MME could then work with the HSS to authenticate the WCD and could obtain from the HSS a WCD profile record including WCD service profile and capabilities information and could provide the profile record to the eNodeB for storage in the WCD context record.

Further, the MME could then work with the eNodeB and SGW to coordinate setup for the WCD of one or more bearers for carrying data between the WCD and the PGW, with each bearer having an associated bearer identity and quality of service class indicator (QCI) among other parameters such as maximum bit rate and the like. In particular, for each such bearer, the MME could engage in signaling with the eNodeB and SGW to establish for the WCD an S1 tunnel between the eNodeB and SGW, the SGW could responsively engage in signaling with the PGW to establish for the WCD an S5 tunnel between the SGW and the PGW, and the eNodeB could store in the WCD context record information about the bearer such as a bearer identifier, S1 tunnel endpoint information, QCI information, maximum bit rate, and the like.

In addition, the eNodeB and WCD could engage in signaling with each other to establish security parameters for their RRC connection. For instance, the eNodeB and WCD could negotiate to use of a particular security algorithm and associated keys or the like for encrypting their RRC communications. And the eNodeB could store these security parameters in the WCD context record as well.

Through this or other processes, the eNodeB would thus have an established WCD context record containing information that can facilitate the eNodeB's service of the WCD. For instance, the WCD context record could include RRC identification information to facilitate RRC communication between the eNodeB and the WCD, bearer information such as S1 tunnel identification and QCI per bearer, security information to facilitate encrypted RRC communication between the eNodeB and the WCD, and WCD service profile and capability information, among other possibilities.

Once the WCD is so connected with the eNodeB and attached, the eNodeB could then coordinate data communications to and from the WCD. For instance, when data arrives on network 24 for transmission to the WCD, the data could flow on a WCD bearer from the PGW to the SGW to the eNodeB, and the eNodeB could coordinate transmission of that data over the air to the WCD. And when the WCD has data to transmit on network 24, the eNodeB could coordinate transmission of that data over the air from the WCD to the eNodeB, and the eNodeB could forward that data along a WCD bearer to the PGW for transmission on network 24.

Further, while the eNodeB is serving the WCD, changes could occur in the WCD's service context, and the eNodeB could update its stored WCD context record accordingly. For instance, upon initiation or termination of certain types of communication (e.g., voice calls or the like), bearers of certain types (e.g., particular QCIs) could be added or removed from the WCD's service, and the eNodeB could update the WCD context record accordingly to add or remove associated bearer information, so that the eNodeB could make appropriate use of the bearers. And as another example, for various reasons, the WCD's service profile might change, and the eNodeB could update the WCD context record to indicate the new WCD profile information, so that the eNodeB could serve the WCD in accordance with the revised profile record.

When a WCD is being served by an eNodeB or is in the process of handing over from the eNodeB to another eNodeB, the WCD could experience a radio-link failure. The WCD could detect a radio-link failure in various ways. For instance, the WCD could detect that reference signal strength from the WCD's serving eNodeB has dropped to a threshold low level and/or that error rate in air interface communications from the serving eNodeB have risen to a threshold high level. Or in a handover scenario, after the WCD receives a directive to connect with a target eNodeB, the WCD could attempt to connect with that target eNodeB but the attempt might fail (e.g., the WCD may not receive a random access response from the target eNodeB).

Normally when a WCD detects a radio-link failure, the WCD could attempt to reconnect with the eNodeB at issue. And if reconnection with that eNodeB fails, the WCD could then responsively scan for coverage and, upon finding coverage, could engage in an RRC connection re-establishment process with the new eNodeB that provides that coverage. (In theory, this could be the same eNodeB as to which the WCD experienced the radio-link failure. But it would more likely be a new eNodeB.) Namely, the WCD could engage in random access signaling with the new eNodeB and then, rather than sending an RRC connection request to the eNodeB, could send an RRC connection re-establishment request to the base station.

In the RRC connection re-establishment request, the WCD could specify its identity (e.g., C-RNTI) and the PCI of the old eNodeB coverage area in which the WCD was being served, as well as a re-establishment cause code. As the new eNodeB then does not have a context record for the WCD, the new eNodeB could then transmit a fetch-context request message to the old eNodeB, to request from the old eNodeB a copy of the WCD's context record so as to facilitate serving the WCD. Namely, the new eNodeB could map the old eNodeB's PCI (provided in the re-establishment request) to an IP address of the old eNodeB and then generate and transmit via an X2 interface to the old eNodeB a fetch-context request requesting a copy of the context record that the old eNodeB has stored for the WCD. And the old eNodeB could responsively transmit to the new eNodeB a fetch-context response message carrying a copy of the WCD's context record, which the new eNodeB could then store and reference to facilitate readily serving the WCD.

In an example implementation, if the WCD context record specifies bearer information such as S1 tunnel information and QCI information, the new eNodeB could readily engage in signaling to transfer each applicable S1 tunnel for the WCD from the old eNodeB to the new eNodeB (e.g., sending a path switch request to the MME to request transfer of the S1 tunnel), and the new eNodeB could serve the WCD in accordance with the applicable QCI information. Further, if the WCD context record specifies radio link security parameters such as an agreed security algorithm and perhaps associated keys, the new eNodeB could readily engage in secure radio link communication with the WCD without a need to first re-negotiate those security parameters.

As noted above, however, this process could fail if the old and new eNodeBs are unable to transfer the WCD context record. In particular, as indicated, if the eNodeBs are provided by different vendors or are otherwise differently configured, the eNodeBs might not use the same context-transfer protocol as each other. For instance, they may use different fetch-context request messages, so that the old eNodeB would not understand a fetch-context request message from the new eNodeB, and/or they may use different fetch-context response messages, so that the new eNodeB could not understand a fetch-context response message from the old eNodeB. Further, there could be other situations where the old and new eNodeBs are unable to transfer the WCD context record. For instance, if the X2 interface between the eNodeBs is threshold highly loaded, it may not be possible for the eNodeBs to engage in the context record transfer via the X2 interface quickly enough, particularly if the WCD is engaged in an interruption-sensitive communication such as a voice call or the like.

Absent the present advance, if the new eNodeB is unable to get the WCD's context record from the old eNodeB, the RRC connection re-establishment process could fail. And as a result, the WCD may need to then establish a fresh connection with the new eNodeB, going through the full connection process discussed above, which could be time consuming and could lead to user experience issues, particularly if the WCD is engaged in an interruption-sensitive communication.

Per the present disclosure, to help avoid this issue, an eNodeB serving a WCD will provide the WCD with a copy of the WCD context record maintained by the eNodeB, and the WCD will store that context record. If and when the WCD then experiences a radio-link failure and connects with a new eNodeB, the WCD will transmit to the new eNodeB a copy of the stored WCD context record, to enable the new eNodeB to readily serve the WCD.

In an example implementation, the eNodeB serving the WCD could provide the WCD with a copy of the WCD context record at the time of the WCD's initial attachment (if applicable). For example, when a WCD initially connects with an eNodeB and attaches with the network, the eNodeB could transmit a copy of the WCD context record within an attach accept message or other RRC message that the eNodeB sends to the WCD. Alternatively, the eNodeB could transmit the WCD context record to the WCD at other times and/or in other messages. Further, if and when the WCD context record at the eNodeB changes, as discussed above for instance, the eNodeB could transmit to the WCD an update to the WCD context record (e.g., a change-directive or a replacement copy of the context record), perhaps in an RRC connection reconfiguration message or other message to the WCD.

When the WCD then experiences a radio-link failure and transmits an RRC connection re-establishment message to the new eNodeB, the WCD could include within that RRC connection re-establishment message, or in a separate message, the WCD context record received from the old eNodeB. In particular, the WCD could retrieve the WCD context record from data storage and could transmit the context record in an RRC message to the new eNodeB, thus completing a transfer of the WCD context record from the old eNodeB to the new eNodeB via the WCD. The new eNodeB could then make use of the provided context information to readily serve the WCD a noted above.

In practice, an eNodeB could be configured to always transmit to a served WCD a copy of the WCD's context record, to enable the WCD to transfer the context record to a new eNodeB in the event the WCD experiences a radio link failure. This could be especially useful in a scenario where the serving eNodeB is adjacent to another eNodeB that uses a different context-transfer signaling protocol. And a wireless service provider could configure an eNodeB to do this specifically in response to the eNodeB being deployed adjacent to another such eNodeB.

Alternatively, an eNodeB could be configured to transmit to a served WCD a copy of the WCD's context record only in select situations. For instance, a serving eNodeB could be configured to do so when the WCD is engaged in interruption-sensitive communication, such as if the WCD is engaged in a voice-over-IP call or the like, and/or if a backhaul interface (e.g., supporting X2 communication) of the first base station is threshold heavily loaded with communication traffic. In these situations, it could be especially useful for the WCD to have a stored copy of its context record, so that the WCD could complete transfer of the context record to a new eNodeB in the even the WCD experiences a radio-link failure.

Figure 2:
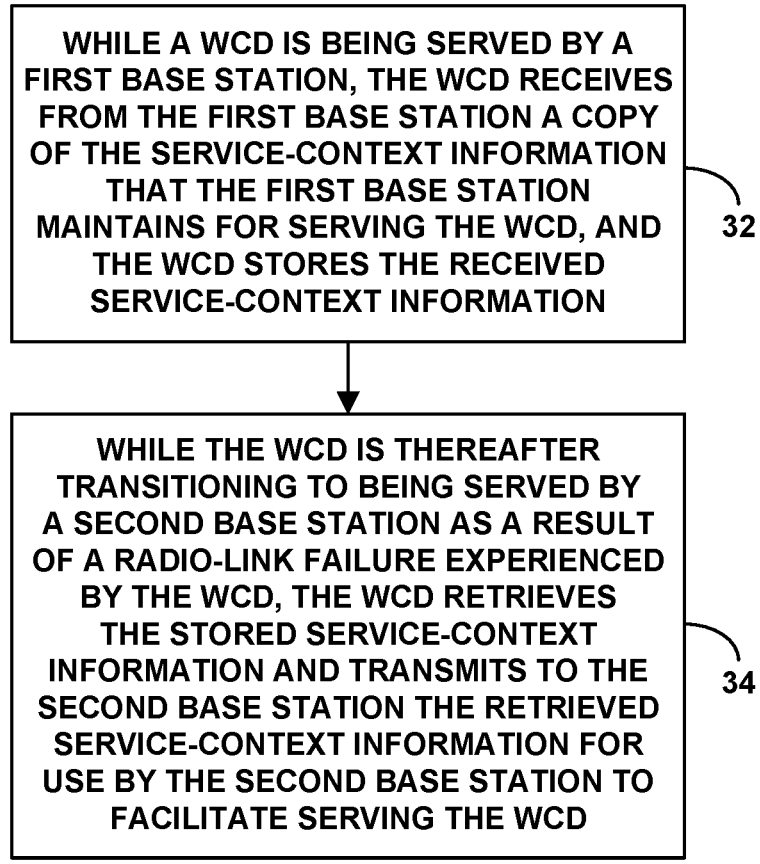
FIG. 2 is a flow chart depicting functions that can be carried out in accordance with the disclosure.

FIG. 2 is flow chart depicting a method that can be carried out in a wireless communication system in which a first base station serves a WCD and maintains service-context information (e.g., a WCD context record) to facilitate serving the WCD, the service-context information including at least at least WCD bearer connection information (e.g., S1 tunnel endpoint information and QCI information), and perhaps other context information as discussed above. In line with the discussion above, the method provides for transferrin the service-context information from the first base station to a second base station to facilitate transition of the WCD from being served by the first base station to being served by the second base station. As shown in FIG. 2, at block 32, while the WCD is being served by the first base station, the WCD receives from the first base station the service-context information and stores the received service-context information. And at block 34, while the WCD is thereafter transitioning to being served by the second base station as a result of a radio-link failure experienced by the WCD, the WCD retrieves the stored service-context information and transmits to the second base station the retrieved service-context information for use by the second base station to facilitate serving the WCD.

As discussed above, the act of receiving the service-context information from the first base station could occur at least in part in association with the WCD initially attaching with the first base station, such as in an attach accept message or other message. Further, the act of receiving the service-context information from the first base station could involve receiving from the first base station an initial record of the service-context information (e.g., in an attach accept message) and subsequently receiving from the first base station an update of the service-context information (e.g., when the service-context information maintained by the first base station changes).

In addition, the method could include the WCD detecting the radio-link failure and, as a result of the detected radio-link layer failure, the WCD transmitting to the second base station a radio-link re-establishment request message (e.g., an RRC connection re-establishment message), in which case the WCD could include the retrieved service-context information within the radio-link re-establishment request message.

Figure 3:
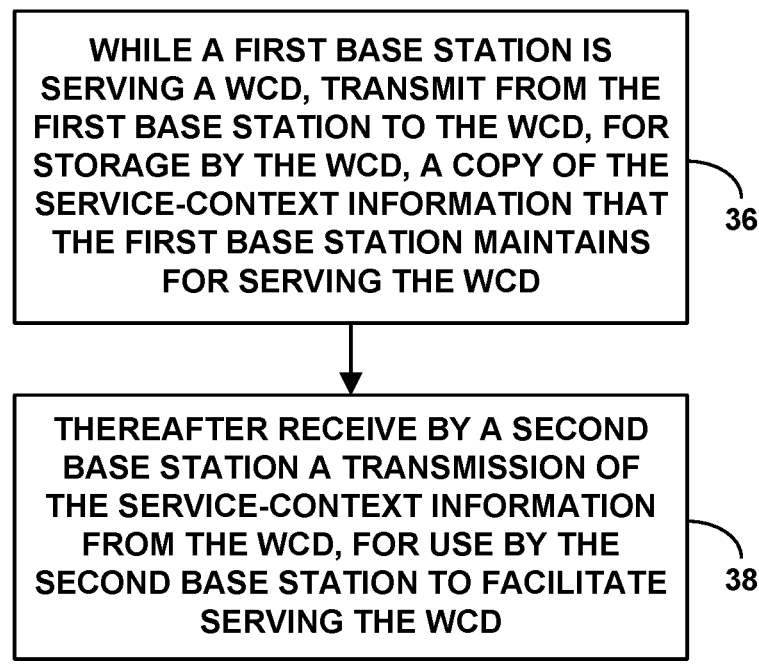
FIG. 3 is another flow chart depicting functions that can be carried out in accordance with the disclosure.

FIG. 3 is next a flow chart depicting a method that can be carried out to facilitate transition of a WCD from being served by a first base station to being served by a second base station, in a scenario where, while the WCD is being served by the first base station, the first base station maintains service-context information for the WCD, the service-context information including at least bearer-connection information (e.g., S1 tunnel endpoint information and other information) and radio-link security information (e.g., one or more security parameters useable to facilitate secure air interface communication).

As shown in FIG. 3, at block 36, the method includes, while the first base station is serving the WCD, transmitting from the first base station to the WCD the service-context information for storage by the WCD. And at block 38, the method the includes thereafter receiving by the second base station a transmission of the service-context information from the WCD, for use by the second base station to facilitate serving the WCD.

In this method, as discussed above, the act of transmitting from the first base station to the WCD the service-context information could be done in response to detecting a state of operation such as the WCD being engaged in interruption-sensitive communication and/or a backhaul interface of the first base station being threshold heavily loaded.

Further the act of transmitting from the first base station to the WCD the service-context information could involve transmitting from the first base station to the WCD an initial record of the service-context information (e.g., in an attach accept message or other message) and subsequently transmitting from the first base station to the WCD an update of the service-context information (e.g., when the service-context information maintained by the first base station changes). And the act of the second base station receiving from the WCD the service-context information could involve the second base station receiving from the WCD a radio-link re-establishment request message (e.g., an RRC connection re-establishment request message) carrying the service-context information.

Figure 4:
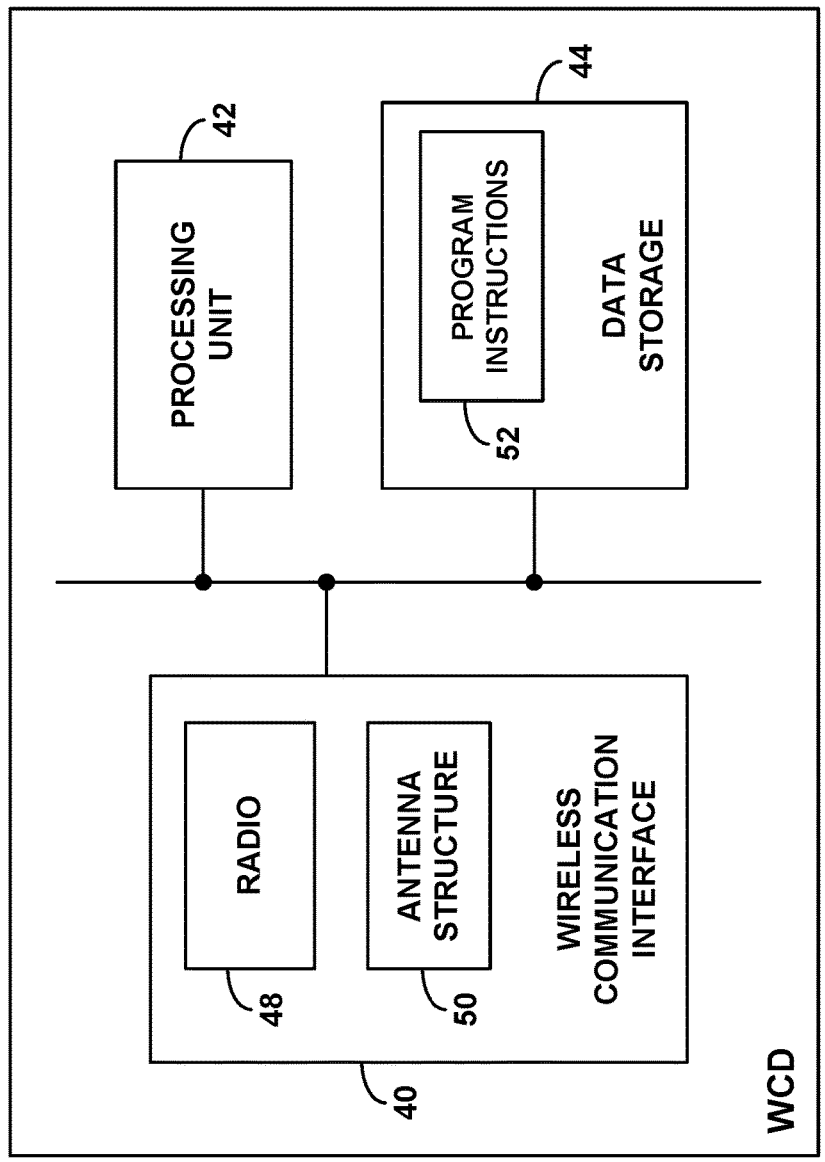
FIG. 4 is a simplified block diagram of a representative WCD operable in accordance with the disclosure

Finally, FIG. 4 is a simplified block diagram of an example WCD configured to transfer service-context information from a first base station to a second base station to facilitate transition of the WCD from being served by the first base station to being served by the second base station in a situation where, while the first base station serves the WCD, the first base station maintains the service-context information for the WCD, the service-context information including at least bearer-connection information (e.g., S1 tunnel endpoint information and perhaps other information) and radio-link security information (e.g., one or more security parameters to facilitate secure air interface communication).

As shown in FIG. 4, the example WCD includes a wireless communication interface 40, a processing unit 42, and non-transitory data storage 44, all of which could be contained within a single WCD housing and coupled together by a system bus, network, or other connection mechanism 46 and/or could be integrated together.

The wireless communication interface 40 includes a radio 48 and an antenna structure 50, cooperatively configured to engage in air interface communication with the first and second base stations. The processing unit 42 includes one or more general purpose processors (e.g., microprocessors) and/or special-purpose processors (e.g., digital signal processors). And the non-transitory data storage 44 includes one or more volatile and/or non-volatile storage components.

As further shown, the non-transitory data storage 44 stores program instructions 52. In practice, these program instructions could be executable by the processing unit 42 to cause the WCD to carry out various operations described herein. For example, the operations could include, while the WCD is being served by the first base station, receiving via the wireless communication interface 40 from the first base station the service-context information and storing the received service-context information in the non-transitory data storage 44. Further, the operations could include, when the WCD is thereafter transitioning to be served by the second base station as a result of a radio-link failure experienced by the WCD, retrieving the stored service-context information and transmitting via the wireless communication interface 40 to the second base station the retrieved service-context information, for by the second base station to facilitate serving the WCD.

Various features discussed above can be applied in this arrangement as well, and vice versa. For example, the act of receiving the service-context information from the first base station could occur at least in part in association with the WCD initially attaching with the first base station. Further, the operations could additionally include detecting the radio-link layer failure and, as a result of the detected radio-link layer failure, transmitting via the wireless communication interface to the second base station a radio-link re-establishment request message, in which case the act of transmitting to the second base station the retrieved service-context information could involve transmitting the retrieved service-context information within the radio-link re-establishment request message.

Exemplary embodiments have been described above. Those skilled in the art will understand, however, that changes and modifications may be made to these embodiments without departing from the true scope and spirit of the invention.

We claim:

1. In a wireless communication system in which a first base station serves a wireless client device (WCD) and maintains service-context information to facilitate serving the WCD, the service-context information including at least WCD bearer connection information, a method of transferring the service-context information from the first base station to a second base station to facilitate transition of the WCD from being served by the first base station to being served by the second base station, the method comprising:

while the WCD is being served by the first base station, receiving by the WCD from the first base station the service-context information and storing by the WCD the received service-context information; and when thereafter transitioning by the WCD to being served by the second base station as a result of a radio-link failure experienced by the WCD, retrieving by the WCD the stored service-context information and transmitting to the second base station the retrieved service-context information for use by the second base station to facilitate serving the WCD.

2. The method of claim 1, wherein receiving the service-context information from the first base station occurs at least in part in association with the WCD initially attaching with the first base station.

3. The method of claim 1, wherein receiving the service-context information from the first base station comprises receiving from the first base station an initial record of the service-context information and subsequently receiving from the first base station an update of the service-context information.

4. The method of claim 3, wherein receiving the initial record of the service-context information comprises receiving the initial record in an attach accept message.

5. The method of claim 3, wherein receiving the update from the first base station comprises receiving the update when the service-context information maintained by the first base station changes.

6. The method of claim 1, further comprising:

detecting by the WCD the radio-link layer failure between the WCD and the first base station; and as a result of the detected radio-link layer failure, transmitting by the WCD to the second base station a radio-link re-establishment request message, wherein transmitting to the second base station the retrieved service-context information comprises transmitting the retrieved service-context information within the radio-link re-establishment request message.

7. The method of claim 6, wherein the radio-link re-establishment request message is a Radio Resource Control (RRC) connection re-establishment request message.

8. The method of claim 1, wherein the bearer connection information comprises S1 tunnel endpoint information, and wherein the service-context information further comprises radio-link security information including one or more security parameters useable to facilitate secure air interface communication.

9. A method to facilitate transition of a wireless client device (WCD) from being served by a first base station to being served by a second base station, wherein, while the WCD is being served by the first base station, the first base station maintains service-context information for the WCD, the service-context information including at least bearer-connection information and radio-link security information, the method comprising:

while the first base station is serving the WCD, transmitting from the first base station to the WCD the service-context information for storage by the WCD; and thereafter receiving by the second base station a transmission of the service-context information from the WCD, for use by the second base station to facilitate serving the WCD.

10. The method of claim 9, wherein the transmitting from the first base station to the WCD the service-context information is done in response to detecting a state of operation selected from the group consisting of (i) the WCD being engaged in interruption-sensitive communication and (ii) a backhaul interface of the first base station being threshold heavily loaded.

11. The method of claim 9, wherein transmitting from the first base station to the WCD the service-context information comprises transmitting from the first base station to the WCD an initial record of the service-context information and subsequently transmitting from the first base station to the WCD an update of the service-context information.

12. The method of claim 11, wherein transmitting to the WCD the initial record of the service-context information comprises transmitting to the WCD the initial record in an attach accept message.

13. The method of claim 11, wherein transmitting to the WCD the update of the service-context information comprises transmitting the update when the service-context information maintained by the first base station changes.

14. The method of claim 9, further comprising receiving by the second base station a radio-link re-establishment request message from the WCD, wherein receiving from the WCD the service-context information comprises receiving the service-context information within the radio-link re-establishment request message.

15. The method of claim 14, wherein the radio-link re-establishment request message is a Radio Resource Control (RRC) connection re-establishment request message.

16. The method of claim 9, wherein the bearer connection information comprises S1 tunnel endpoint information, and wherein the radio-link security information comprises one or more security parameters useable to facilitate secure air interface communication.

17. A wireless client device (WCD) configured to transfer service-context information from a first base station to a second base station to facilitate transition of the WCD from being served by the first base station to being served by the second base station, wherein while the first base station serves the WCD, the first base station maintains the service-context information for the WCD, the service-context information including at least bearer-connection information and radio-link security information, the WCD comprising:

a wireless communication interface, including a radio and antenna structure, configured to engage in air interface communication with the first and second base stations;

a processing unit;

non-transitory data storage; and program instructions stored in the non-transitory data storage and executable by the processing unit to cause the WCD to carry out operations including (a) while the WCD is being served by the first base station, receiving via the wireless communication interface from the first base station the service-context information and storing the received service-context information in the non-transitory data storage, and (b) when the WCD is thereafter transitioning to be served by the second base station as a result of a radio-link failure experienced by the WCD, retrieving the stored service-context information and transmitting via the wireless communication interface to the second base station the retrieved service-context information, for by the second base station to facilitate serving the WCD.

18. The WCD of claim 17, wherein receiving the service-context information from the first base station occurs at least in part in association with the WCD initially attaching with the first base station.

19. The WCD of claim 17, wherein the operations further include:
- detecting the radio-link layer failure between the WCD and the first base station; and
- as a result of the detected radio-link layer failure, transmitting via the wireless communication interface to the second base station a radio-link re-establishment request message, wherein transmitting to the second base station the retrieved service-context information comprises transmitting the retrieved service-context information within the radio-link re-establishment request message.

20. The WCD of claim 17, wherein the bearer connection information comprises S1 tunnel endpoint information, and wherein the radio-link security information comprises one or more security parameters useable to facilitate secure air interface communication.

\* \* \* \* \*